US010609622B2

(12) United States Patent
Bader et al.

(10) Patent No.: US 10,609,622 B2
(45) Date of Patent: Mar. 31, 2020

(54) AD HOC NETWORKING SCHEME FOR MOBILE CYBER-PHYSICAL SYSTEMS

(71) Applicant: KING ABDULLAH UNIVERSITY OF SCIENCE AND TECHNOLOGY, Thuwal (SA)

(72) Inventors: Ahmed Bader, Tla'a Al-Ali District (JO); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 110 days.

(21) Appl. No.: 16/073,052

(22) PCT Filed: Feb. 8, 2017

(86) PCT No.: PCT/IB2017/050689
§ 371 (c)(1),
(2) Date: Jul. 26, 2018

(87) PCT Pub. No.: WO2017/137906
PCT Pub. Date: Aug. 17, 2017

(65) Prior Publication Data
US 2019/0014526 A1    Jan. 10, 2019

Related U.S. Application Data

(60) Provisional application No. 62/293,054, filed on Feb. 9, 2016.

(51) Int. Cl.
H04W 40/20    (2009.01)
H04W 84/18    (2009.01)
(Continued)

(52) U.S. Cl.
CPC .......... *H04W 40/20* (2013.01); *H04L 5/0048* (2013.01); *H04L 69/22* (2013.01); *H04W 64/003* (2013.01);
(Continued)

(58) Field of Classification Search
CPC ...... H04L 5/0048; H04L 69/22; H04W 84/18; H04W 74/04; H04W 64/00; H04W 40/20;
(Continued)

(56) References Cited

U.S. PATENT DOCUMENTS

2008/0018521 A1\* 1/2008 Sahinoglu ................. G01S 7/28
                                                              342/27
2017/0214604 A1\* 7/2017 Qiao ..................... H04W 4/023

OTHER PUBLICATIONS

Jani Saida Shaik, "Simulation-Based Comparative Study of Routing Protocols for Wireless Ad-Hoc Network", Master's Thesis, Electrical Engineering, Sep. 2014, School of Computing, Blekinge Institute of Technology, SE-371 79 Karlskrona,Sweden. (Year: 2014).\*

(Continued)

Primary Examiner — Rownak Islam
(74) Attorney, Agent, or Firm — Patent Portfolio Builders PLLC

(57) ABSTRACT

Embodiments of the present disclosure provide techniques for packet routing. In an embodiment, when a transmitting communication device injects a packet into a communication network, a receiving communication device that is closer to a sink or destination than the transmitting communication device relays the packet in a first hop. In a subsequent hop, a receiving communication device evaluates position information conveyed by the transmitting communication device of the first hop to determine whether to forward the packet. Accordingly, a receiving communication device receiver that offers progress towards the sink can elect to forward the packet.

20 Claims, 18 Drawing Sheets

(51) Int. Cl.
*H04L 5/00* (2006.01)
*H04L 29/06* (2006.01)
*H04W 64/00* (2009.01)
*H04W 74/04* (2009.01)

(52) U.S. Cl.
CPC ............ *H04W 74/04* (2013.01); *H04W 84/18* (2013.01); *Y02D 70/1262* (2018.01); *Y02D 70/144* (2018.01); *Y02D 70/164* (2018.01); *Y02D 70/21* (2018.01); *Y02D 70/22* (2018.01); *Y02D 70/26* (2018.01); *Y02D 70/38* (2018.01)

(58) Field of Classification Search
CPC ................ H04W 64/003; H04W 40/02; Y02D 70/1262; Y02D 70/164; Y02D 70/21; Y02D 70/144; Y02D 70/22; Y02D 70/26; Y02D 70/38
USPC .......................................................... 370/329
See application file for complete search history.

(56) References Cited

OTHER PUBLICATIONS

Čapkun, S., et al., "GPS-free Positioning in Mobile Ad Hoc Networks," Cluster Computing, Jan. 2002, vol. 5, No. 2, pp. 157-167.
International Search Report in related International Application No. PCT/IB2017/050689, dated Apr. 25, 2017.
Ma, J., et al., "Pilot Matrix Design for Estimating Cascaded Channels in Two-Hop MIMO Amplify-and-Forward Relay Systems," IEEE Transactions on Wireless Communications, Jun. 2011, vol. 10, No. 6, pp. 1956-1965.
Written Opinion of the International Searching Authority in related International Application No. PCT/IB2017/050689, dated Apr. 25, 2017.
Zhao, Y., "Motion Vector Routing Protocol: A Position Based Routing Protocol for Mobile Ad Hoc Networks," University of Arizona Dissertations, Apr. 15, 2005, pp. 1-192.

Bader, A., et al.; "Mobile Ad Hoc Networks in Bandwidth-Demanding Mission-Critical Applications: Practical Implementation Insights"; IEEE Access, vol. 5; Sep. 28, 2016; pp. 891-910.
Blair, A., et al.; "Barrage Relay Networks for Cooperative Transport in Tactical Manets"; IEEE Xplore, Dec. 2008; pp. 1-7.
Carlà, L., et al.; "LTE Enhancements for Public Safety and Security Communications to Support Group Multimedia Communications"; IEEE Network, Jan./Feb. 2016; pp. 80-85.
ETSI; "Intelligent Transport Systems (ITS); Vehicular Communicaitons; GeoNetworking; Part 4: Geographical addressingnand forwarding for point-to-point and point-to-multipoint communications; Sub-part 1: Media-Independent Functionality"; EN 302 636-4-1 V1.3.1; Aug. 2017; 97 pages.
Halford, T., et al.; "Barrage Relay Networks"; IEEE, : 2010 Information Theory and Applications Workshop (ITA); 31 Jan. 31-Feb. 5, 2010; 8 pages.
Halford, T., et al.; "Barrage Relay Networks: System & Protocol Design"; IEEE, IEEE 21st International Symposium on Personal Indoor and Mobile Radio Communications; Sep. 26-30, 2010; pp. 1133-1138.
Halford, T., et al.; "The Stability of Multihop Transport with Autonomous Cooperation"; IEEE, The 2011 Military Communications Conference—Track 2—Network Protocols and Performance; Nov. 7-10, 2011; pp. 1023-1028.
Lin, X., et al.; "An Overview of 3GPP Device-to-Device Proximity Services"; IEEE Communications Magazine; Apr. 2014; pp. 40-48.
Thanayankizil, L. V., et al.; "Opportunistic Large Array Concentric Routing Algorithm (OLACRA) Over Wireless Fading Channels"; IEEE, Nov. 26-30, 2007; pp. 1-5.
Xiang, X., et al.; "Self-Adaptive On-Demand Geographic Routing for Mobile Ad Hoc Networks"; IEEE Transactions on Mobile Computing, vol. 11, No. 9; Sep. 2012; pp. 1572-1586.
Zorzi, M., et al.; "Geographic Random Forwarding (GeRaF) for Ad Hoc and Sensor Networks: Multihop Performance"; IEEE Transactions on Mobile Computing, vol. 2, No. 2, Oct.-Dec. 2003; pp. 337-348.

* cited by examiner

Diagonal pilot structure

AD HOC NETWORKING SCHEME FOR MOBILE CYBER-PHYSICAL SYSTEMS

CROSS-REFERENCE TO RELATED APPLICATIONS

This application is a U.S. National Stage Application of International Application No. PCT/IB2017/050689, filed on Feb. 8, 2017, which claims the benefit of and priority to U.S. Provisional Application Ser. No. 62/293,054, having the title "AD HOC NETWORKING SCHEME FOR MOBILE CYBER-PHYSICAL SYSTEMS," filed on Feb. 9, 2016, the disclosures of which are incorporated herein by reference in their entirety.

TECHNICAL FIELD

The present disclosure is generally related to message routing techniques in a mobile ad hoc network.

BACKGROUND

A cyber-physical system is a system of collaborating computational elements that control physical entities. A special class of cyber-physical systems entails the deployment of teams of autonomous robots (unmanned vehicles) as well as human agents to accomplish certain critical missions. Within such a context, swarms of unmanned aerial or terrestrial vehicles are dispatched into the field to conduct a mission under human supervision or control, or in other instances jointly with human agents.

There is a broad spectrum of possible applications for cyber-physical systems. Examples include the use of a swarm of unmanned autonomous vehicles (UAV) for thermal imaging and remote sensing. UAV clusters have been also considered for 3D mapping, surveying, and other civil engineering tasks. Swarms of terrestrial robotic agents are also being increasingly considered for some time-critical field operations most notably for search and rescue and tactical missions. Another manifestation of team-based mobile cyber-physical systems includes task-oriented teams of paramedics and first responders during disasters or massively crowded events.

The availability of real-time video communications for those scenarios is indeed a powerful tool for collaborative decision-making and optimal mission execution. A paramount task for team-based mobile cyber-physical system is the joint planning and optimization of motion trajectories of the mobile devices. The timeliness of disseminating path planning and control signaling messages is crucial. Hence, end-to-end latency is a major performance metric. UAV-based cyber-physical systems may be quite bandwidth-hungry. This is true since real-time video communication is sought between the team members. As a special case of mobile ad hoc networks (MANET), team-based mobile cyber-physical systems undoubtedly push the envelope in terms of latency and throughput requirements.

Indeed, MANET is a well-established technical field that is at least a couple of decades old. MANET research space further evolved to cover vehicular and flying ad hoc networks (VANET and FANET respectively). Multihop packet routing has always been at the forefront of MANET, VANET, and FANET research challenges. Geographical routing (geo-routing) has been widely adopted in the context of MANET due to its resilience to mobility and network topological changes. As a matter of fact, geo-routing has been embraced by the European Telecommunications Standards Institute (ETSI) as a standard VANET routing technique for Intelligent Transport Systems (ITS).

SUMMARY

Embodiments of the present disclosure provide systems and methods for packet routing. The packet routing can be over an ad hoc network. Briefly described, one embodiment of the methods, among others, can be broadly summarized by the following steps: receiving, at a communication device, a packet from a source device; extracting position information from a preamble structure of the packet; determining a position of the source device relative to the position of the communication device based at least in part on the position information in the preamble structure of the packet; computing a progress in routing the packet that has been made towards a destination (e.g., a communication device at the destination) with respect to the source device as a progress value; determining, at the communication device, to forward the packet towards the destination based at least in part on the progress value; inserting the progress value within the preamble structure of the packet as updated position information; and/or transmitting, at the communication device, the packet towards the destination.

In any one or more aspects of the methods, the progress can be computed by estimating an energy of a received waveform during an interval corresponding to the preamble structure. The progress value can be quantized using 6 bits. The step of determining to forward the packet can comprise scanning the preamble sequence to extract the position information, determining a respective position for each previous hop of the packet, and determining whether a current hop of the packet has made progress towards the destination. The methods can further comprise the step of determining a current position of the communication device from an external localization signal sent from a central control station, or the step of determining a current position of the communication device from at least three position values of neighboring communication devices obtained from respective preamble structures of packets received by the communication device and a time of arrival of the respective packets at the communication device, or both. An additional preamble structure can be retrieved from the packet, the additional preamble structure containing a setting for AGC gain within a receiver of the communication device. The communication device can be integrated within an unmanned autonomous vehicle or a mobile cyber-physical system, or both. The communication device can comprise a wearable communication device. The communication device can comprise a mobile ad hoc network device. The communication device can be configured to broadcast a video stream to peer communication devices. The communication device can be configured to unicast a video stream to a central control station. The methods can further comprise the step of retrieving one or more pilot symbols from the packet and estimating a channel response of one or more subcarriers of a composite channel. The one or more pilot symbols can comprise a diagonal pilot structure.

The present disclosure also describes embodiments of an apparatus configured to execute any one or more embodiments and aspects of the aforementioned methods. The apparatus can comprise a communication device.

In addition, the present disclosure can be viewed as providing embodiments of a system for packet routing. The system can comprise a communication interface of a communication device. One embodiment of such a system, among others, can be broadly summarized as follows. A processing circuit module of the communication device is configured to: receive a packet from a source device; extract position information from a preamble structure of the packet; determine a position of the source device relative to the position of the communication device based at least in part on the position information in the preamble structure of the packet; compute a progress in routing the packet that has been made towards a destination with respect to the source device as a progress value; determine to forward the packet towards the destination based at least in part on the progress value; insert the progress value within the preamble structure of the packet as updated position information; and/or cause a communication interface of the communication device to transmit the packet towards the destination. The system can further include the source device, a destination device, and/or other communication devices that receive and/or forward the packet in its path towards the destination device. The progress can be computed by estimating an energy of a received waveform during an interval corresponding to the preamble structure. Determining to forward the packet can comprise scanning the preamble sequence to extract the position information, determining a respective position for each previous hop of the packet, and determining whether a current hop of the packet has made progress towards the destination. The processing circuit module of the communication device can be configured to carry out any one or more of the other aforementioned aspects of the methods.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
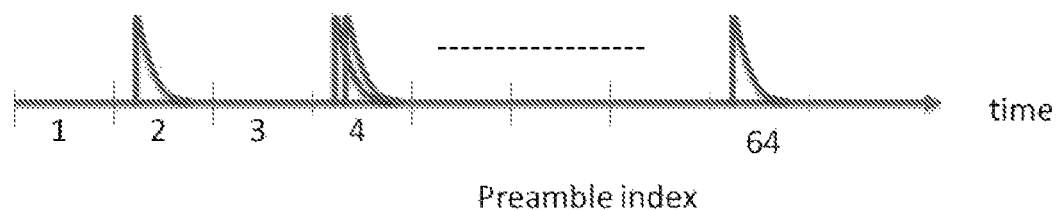
FIG. 1 is an illustration of the power delay profile at the output of a preamble correlation/detection module of a MANET device in accordance with embodiments of the present disclosure.

The present disclosure describes various message routing techniques for mobile ad hoc networks, such as those utilized by mobile cyber physical systems. Mobile cyber-physical applications are associated with ultra-low latency constraints and high capacity requirements. For example, current implementations of geo-routing are plagued by an overhead that grows rapidly with device density and/or frame arrival rate. This indeed has adverse consequences on latency and throughput performance which have been identified and prioritized by many leading entities in the field as a serious challenge in the context of mobile ad hoc networks. In this disclosure, an embodiment of a high-throughput ultra-low-latency MANET scheme is presented. The scheme is designed for direct implementation on a special generation of long term evolution (LTE) chipsets, among others.

It is worthwhile to note that the 3rd Generation Partnership Project (3GPP) has recently released a technical report, TR 36.843, under the umbrella of Release 12 of the LTE standardization roadmap. The technical report defines a technology that allows LTE-based devices to directly communicate with each other. Such a device-to-device (D2D) communication paradigm can also occur independently of any cellular infrastructure.

An embodiment of a high-throughput ultra-low-latency MANET device of the present disclosure delivers outstanding latency and throughput performances while being non-invasive to the underlying physical layer (PHY) specification of the LTE protocol stack. In other words, such an embodiment exploits the existing PHY tools and does not necessitate any major modification to the PHY specification. Thereby, it can be, but is not limited to being, implemented in practice using commercially off the shelf (COTS) chipset platforms.

Broadly speaking, classical geo-routing may take one of the following two forms:

1) Beacon-based geo-routing whereby position beacons are exchanged among neighboring devices, so as to maintain up-to-date topological awareness.

2) Beaconless geo-routing such that receiver-based contention takes place to select the optimal packet forwarding device.

Both cases however suffer from the aforementioned large routing overhead problem. This is either due to message exchange overhead for the case of beacon-based protocols, or due to contention resolution overhead in the beaconless case. The underlying routing overhead can be eliminated by devising a contention-free beaconless geo-routing mechanism, such as by using blind cooperative relaying, whereby multiple devices concurrently transmit the same frame or packet. The notion of concurrency is fairly accurate at the packet-level time scale. At the symbol-level however, the cooperative transmitters are not perfectly aligned in time, thereby causing inter-symbol interference (ISI) at the receiver.

To handle the artificial multipath created by such concurrent transmissions, the transceivers of an embodiment of the MANET device benefit from the underlying orthogonal frequency division multiplexing (OFDM) PHY of the LTE standard protocol stack. As long as signal copies from concurrent transmissions arrive within the guard interval of the OFDM symbol, then the signal can be decoded properly. On the other hand, each MANET device can be equipped with the localized capability of qualifying whether it makes positive progress towards the sink or not. At a given hop i, MANET devices which are concurrently transmitting a frame convey their relative position information to the receivers of peer or neighboring MANET devices. This is accomplished by exploiting the LTE's random access channel (RACH) preamble structure.

In the LTE standard, when an LTE communication device (e.g., MANET device) intends to establish a connection to another peer device, the transmitting device initiates a random access procedure by transmitting a preamble via the RACH. The preamble takes the form of a Zadoff-Chu sequence. The Zadoff-Chu sequence satisfies constant amplitude zero autocorrelation (CAZAC) property. The CAZAC property allows multiple orthogonal sequences to be generated from the same Zadoff-Chu sequence. The transmitting device can choose and send a preamble out of 64 orthogonal preambles, which are made from the same Zadoff-Chu sequence. Upon receiving preambles via the common RACH, the receiving peer device calculates a power delay profile to detect which preambles are sent.

In an exemplary embodiment, a given preamble index can be naturally chosen by one or more LTE devices. For the receiving device to know whether a given preamble index was sent or not, the receiving device estimates the total energy during the interval corresponding to the preamble by using a power delay profile, and determines that the preamble is sent if the estimated energy is higher than a threshold. The energy estimate can be obtained based on the output of a cross-correlation function, whereby the incoming signal is correlated with the preamble signature corresponding to that index.

As an illustration, FIG. 1 provides a power delay profile at an output of a preamble detection/correlation module (of a receiver for a MANET device) in which there are 64 sequences offering 64 random access channels (RACH) unique signatures to LTE devices. In this particular example, it is shown that the signature with index=4 has been selected by two LTE devices. Along with the preamble detection/correlation module, circuitry and/or firmware of the MANET device receiver can also include other modules/circuitry components for use in OFDM processing such as FFT unit(s), parallel-to-serial data conversion unit(s), demodulation unit(s), deinterlacing and decoding unit(s), etc. Correspondingly, a MANET device transmitter likewise can include modules/circuitry components for use in OFDM processing such as coding and interlacing unit(s), bit-to-symbol mapping unit(s), modulation unit(s), serial-to-parallel conversion unit(s), IFFT unit(s), cyclic prefix insertion unit(s), etc. Further, other circuitry or modules can also be used for processing signals received by or transmitted by the MANET device. As a non-limiting example, the receiver may perform AGC, via an AGC module/circuitry, on a time-domain signal prior to performing fast Fourier transform (FFT) to transform the time-domain signal to frequency domain, among other processes.

In accordance with embodiments of the present disclosure, each MANET device computes the progress it makes towards the destination with respect to the source. Within the context of this disclosure, progress is defined as: the projection of the device's position on the line connecting the source and destination. The MANET device then quantizes its progress to 64 quantization levels, corresponding to the number of indices made available by the LTE preamble structure. In other words, it quantizes its progress attribute using 6 bits.

More quantization bits can be catered for in accordance with the present disclosure. Per the LTE standard, each RACH occupies at least 6 resource blocks of 6×180=1080 kHz. As such, additional resource blocks in the frequency domain may be allocated for RACH preambles. For example, allocating two RACH resource blocks increases the number of quantization bits from 6 to 7 and so on. For example, in a 10-MHz channelization plan, there could be as many as 9 RACH resource block multiplexed in the frequency domain. This increases the number of progress quantization bits to 9 bits.

A challenge however in allocating more frequency-domain resource blocks for RACH is the additional processing burden on LTE devices. Depending on the computational power of the LTE device, the processing of frequency-multiplexed RACH blocks may prove to consume a substantial amount of time. Alternatively, multiple RACH blocks can be sequentially distributed over time. However, this results in increasing the overhead of the routing protocol in terms of time consumption. Nonetheless, for the purpose of team-based MANET application scenarios, it can be shown that 6 quantization bits are quite sufficient. This is mainly true due to the geographically confined nature of such applications.

A receiving device can scan through all preamble sequences to extract the progress made by the packet in its previous hop. Accordingly, each receiving MANET device locally decides whether to forward the frame or not. The decision criterion is as follows: if a MANET device makes better progress than all other MANET devices of the previous hop, it decides to relay the packet ahead. By means of such a relaying criterion, an embodiment of the high-throughput ultra-low-latency MANET scheme is able to cater for a totally contention-free geo-routing method.

Figure 2:
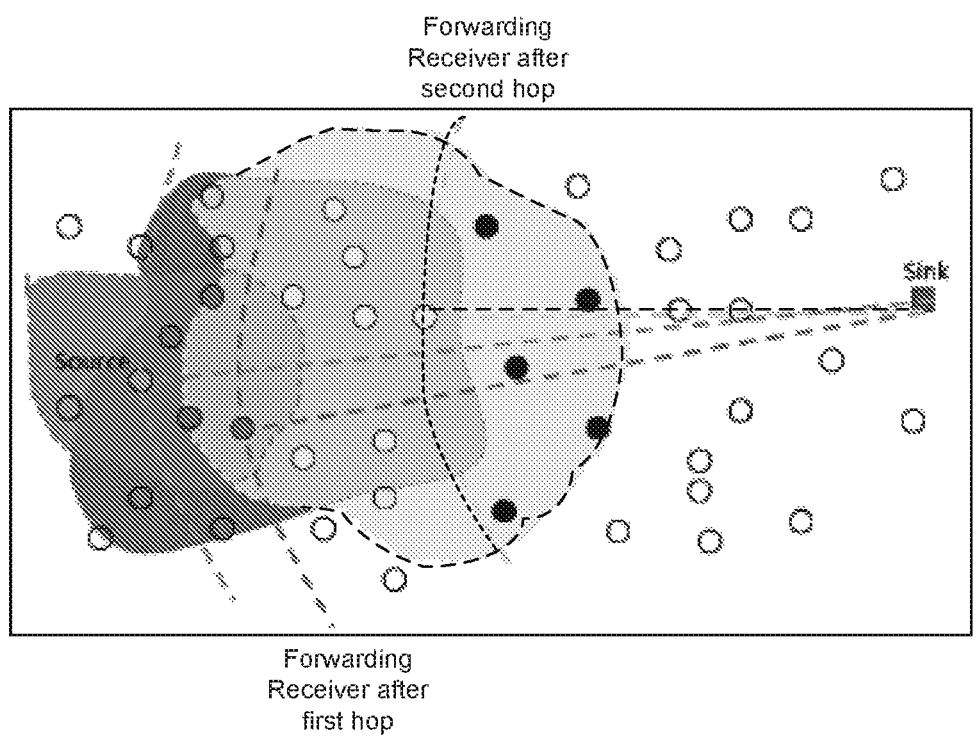
FIG. 2 is an illustration of an operation of a contention-free geo-routing scheme in accordance with embodiments of the present disclosure.

The contention-free geo-routing scheme employed by the embodiments of the present disclosure is further illustrated and described in FIG. 2. It should be noted however, that the only case in this scheme where a MANET device needs to contend for medium access is when it is the source of a frame. In that case, classical clear channel assessment (CCA) techniques can be used to qualify whether the channel is idle or not before transmission, in one embodiment.

With respect to FIG. 2, an illustration of the operation of the contention-free geo-routing method in accordance with embodiments of the present disclosure is provided. For the figure, when a source (e.g., transmitting communication device) injects a frame or packet into the mobile ad hoc network, MANET receiving communication devices who are closer to the sink than the source relay the frame in the first hop. In the second hop, each MANET receiver goes through position information conveyed by the transmitters of the first hop to determine whether to forward the frame or not. Any second-hop MANET receiver which offers progress towards the sink can determine or decide to forward the frame and so on.

Position information, as used in FIG. 2, can be determined based on the following methodology in accordance with embodiments of the present disclosure. For an anchor-based displacement calculation, it is assumed that each MANET device has an initial access to a localization signal, e.g. a global position system (GPS) signal, whereby a common reference point is advertised by a centralized control or command station. Thereafter, each MANET device is set to maintain its displacement from that common reference point. However, it is likely expected that MANET devices may lose access to the localization signal and therefore become unaware of its exact actual position. This may jeopardize the performance of the geo-routing scheme presented above since the lack of position information adversely affects the accuracy of the relaying decision. Nonetheless, embodiments of the high-throughput ultra-low-latency MANET device provide the ability to track displacement relevant to nearby anchors as described below.

In accordance with one embodiment, it is assumed that for any given MANET device in a mobile ad hoc network, there exist at least 3 neighbors who are still able to maintain a feasible access to an external localization signal. It is assumed that at any point of time, the displacement from the reference point does not need to be encoded with more than 6 bits. At regular time intervals, all of the devices with clear access to the localization signal transmit their current displacement. These devices are the ones labeled herewith as anchors.

Figure 3:
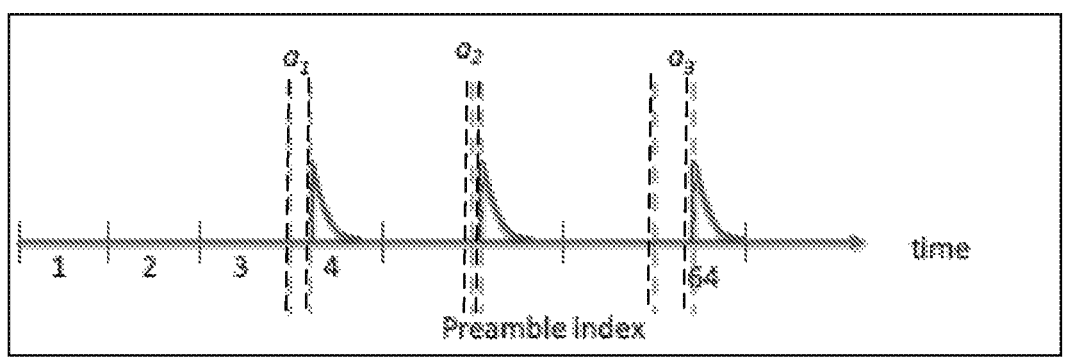
FIG. 3 is an illustration of extraction of displacement information from RACH blocks in accordance with embodiments of the present disclosure.

Each anchor transmits the preamble signature index corresponding to its 6-bit quantized displacement. MANET devices out of access with respect to the localization signal extract the displacement information from the RACH blocks as illustrated in FIG. 3. This technique assumes that the underlying preamble detection/correlation module of the receiver for the MANET device is able to output the time of arrival (TOA) with respect to the beginning of a preamble sequence correlation window. For example, in FIG. 3, the value of a1-a3 comprises the time of arrival (TOA), where the values are extracted from the preamble sequence correlation process. Accordingly, the time difference of arrival (TDOA) between all anchor transmissions can be computed. Now an out-of-sync receiver has two valuable pieces of information:

1. The current position of at least three anchors calculated in terms of displacement from the common reference point.

2. The TDOA of the signals arriving from these anchors. This can be utilized to compute the receiver's position with respect to the anchors.

Figure 4:
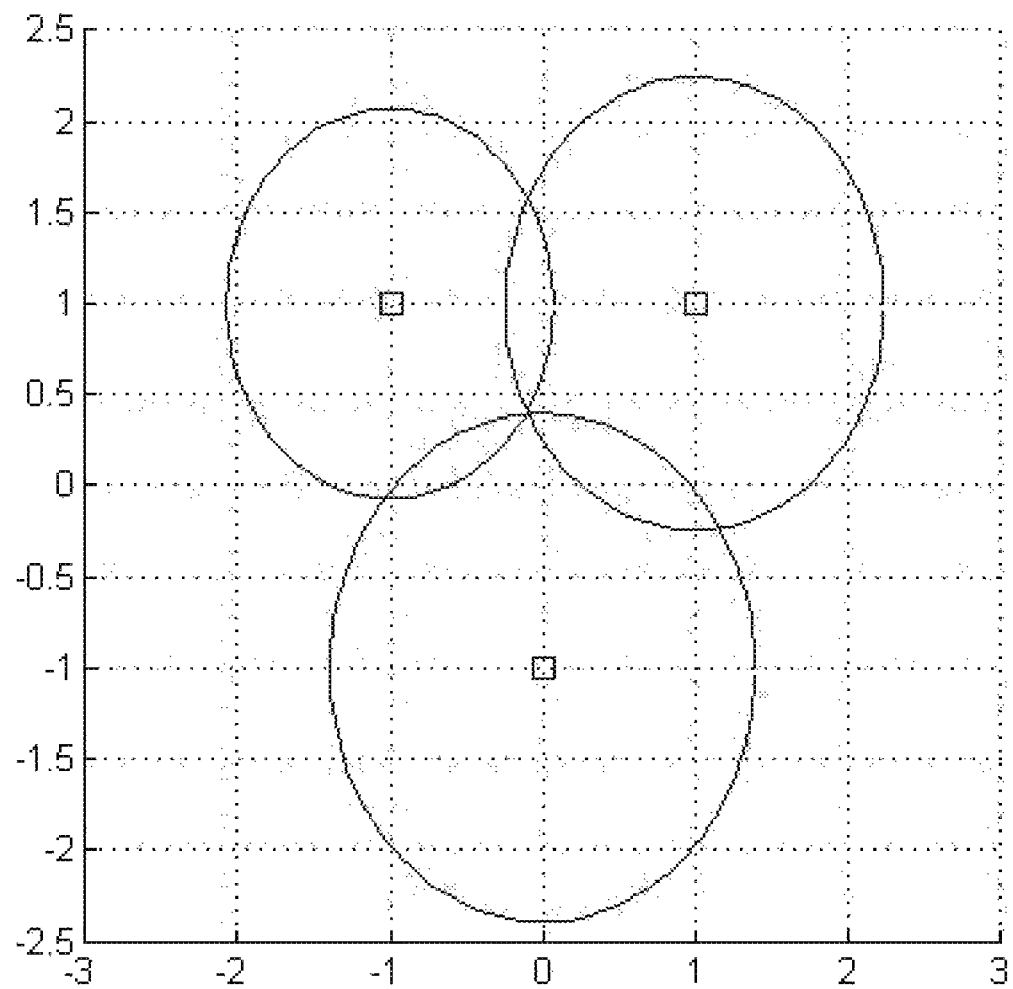
FIG. 4 is an illustration of a time difference of arrival (TDOA)-based method for adjusting the displacement of a device relative to the displacement information received from anchors in accordance with embodiments of the present disclosure.

In general, the TDOA values can be used by receivers of MANET devices to adjust their position information via the execution of any suitable triangulation method, as is understood by one of ordinary skill in the art. FIG. 4 offers an illustration of a TDOA-based method for adjusting the displacement of a MANET device relative to the displacement information received from anchors. Each receiver iteratively solves a system of equations invoked by the underlying triangulation method to locate the point where all three circles intersect (or when the region of the solution becomes small enough).

Figure 5:
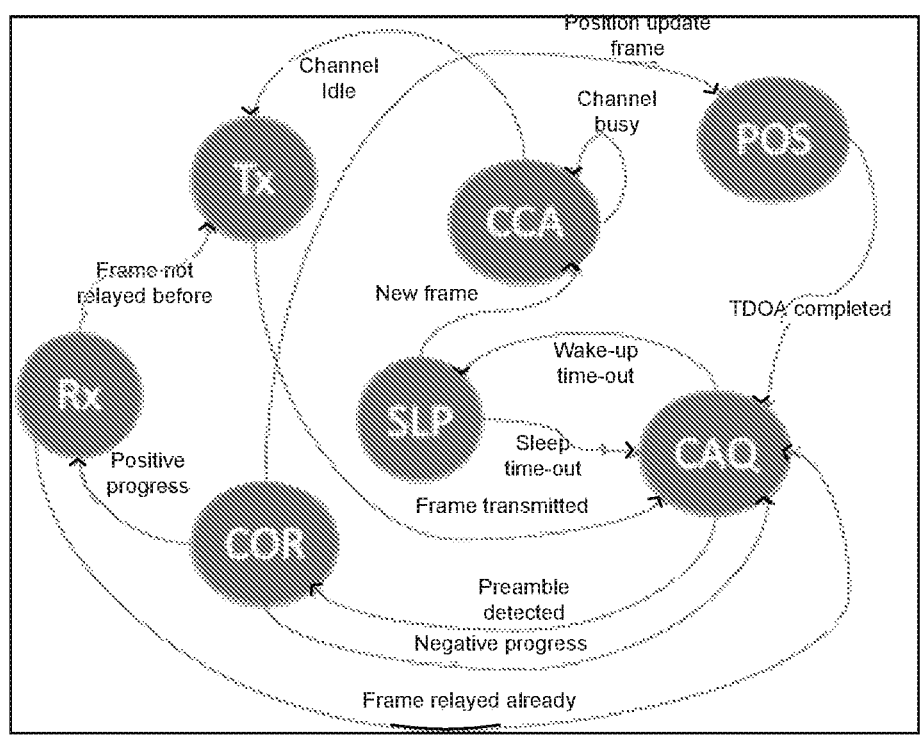
FIG. 5 is an illustration of a state diagram demonstrating an operation of a geo-routing scheme in accordance with embodiments of the present disclosure.

A state diagram of the underlying geo-routing scheme is depicted in FIG. 5 in accordance with embodiments of the present disclosure. Here, the transition from one state to the other is illustrated, with a description of each state being provided in Table 1.

TABLE 1

| State | Definition |
| --- | --- |
| CAQ | Channel Acquisition |
| SLP | Sleep |
| CCA | Clear channel assessment |
| COR | Preamble sequence correlation |
| Rx | Receive the whole frame |
| Tx | Transmit (whether a source or relay) |
| POS | Position Adjustment |

Using the incoming preamble signal, synchronization can be accomplished on the fly. In other words, the geo-routing scheme in accordance with the present disclosure does not mandate an explicit synchronization message. In various embodiments, a fairly accurate clock and frequency synchronization between MANET devices is attained via an external localization signal such as the GPS pulse per second (PPS) signal. As such, MANET devices can then be aligned to a universal time reference. However, the acquisition of the GPS PPS signal in is not continuously performed, in order to save energy, in various embodiments. As such, a universal time reference is assumed to not generally exist. Instead, a MANET device in the receiving (Rx) state aligns its time reference to the first energy arrival, in one embodiment. Therefore, MANET devices within a neighborhood can generally have different time references. This concept is further illustrated in FIG. 6.

Figure 6:
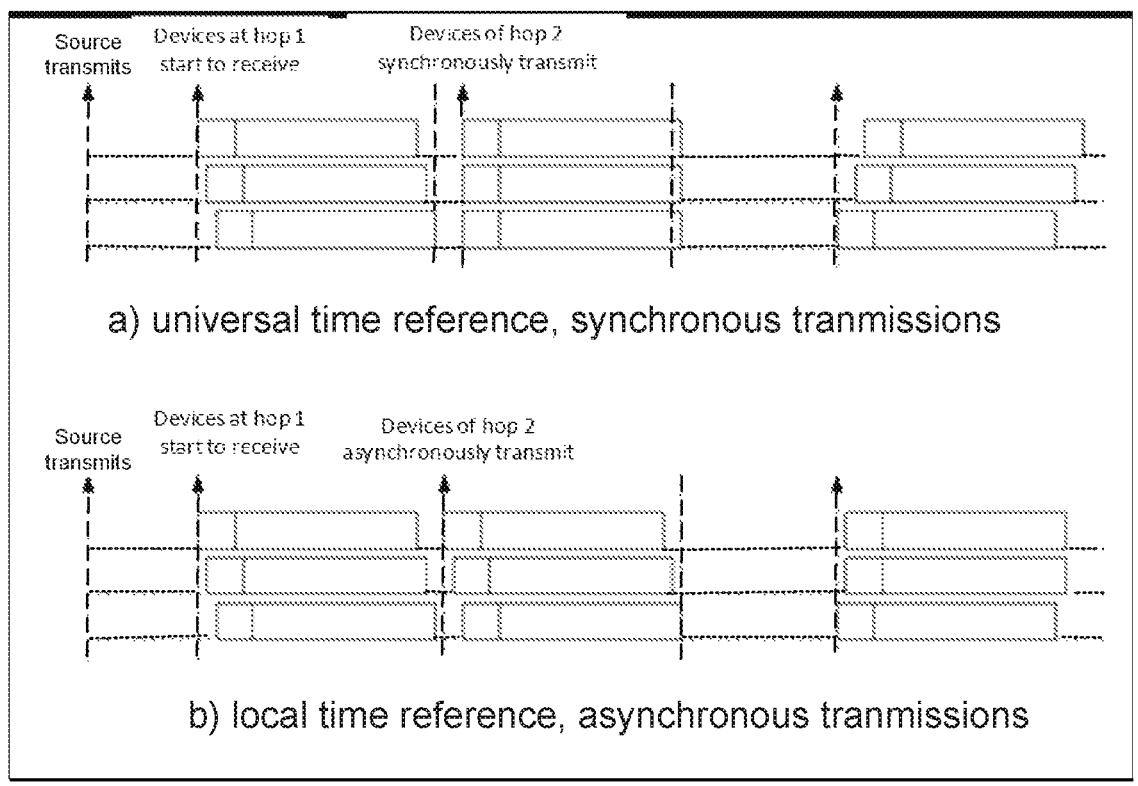
FIG. 6 is an illustration of processes for frequency synchronization in devices using a universal time reference and not using a universal time reference in accordance with embodiments of the present disclosure.

As depicted in FIG. 6, when a universal time reference is available in the network by means of GPS for example, synchronous relaying is possible at each hop. A more general case however is to have asynchronous transmissions, since non-aligned time references can result in asynchronous transmissions by relays. Therefore, it is constructive at this point to study the implications of asynchronous relaying on the delay spread at the destination.

The total delay spread is naturally the sum of the forwarding delay spread and the multipath delay spread. At the first glance, one may expect the forwarding delay spread to grow indefinitely as packets progress towards the destination. However, a closer look at the issue suggests otherwise.

The first few relays to receive and then transmit the packet at hop i are typically those who are the closest to the devices of (i−1)th hop. At the same time, they are typically the farthest from the (i+1)th hop and thus have the largest propagation delays.

Figure 7:
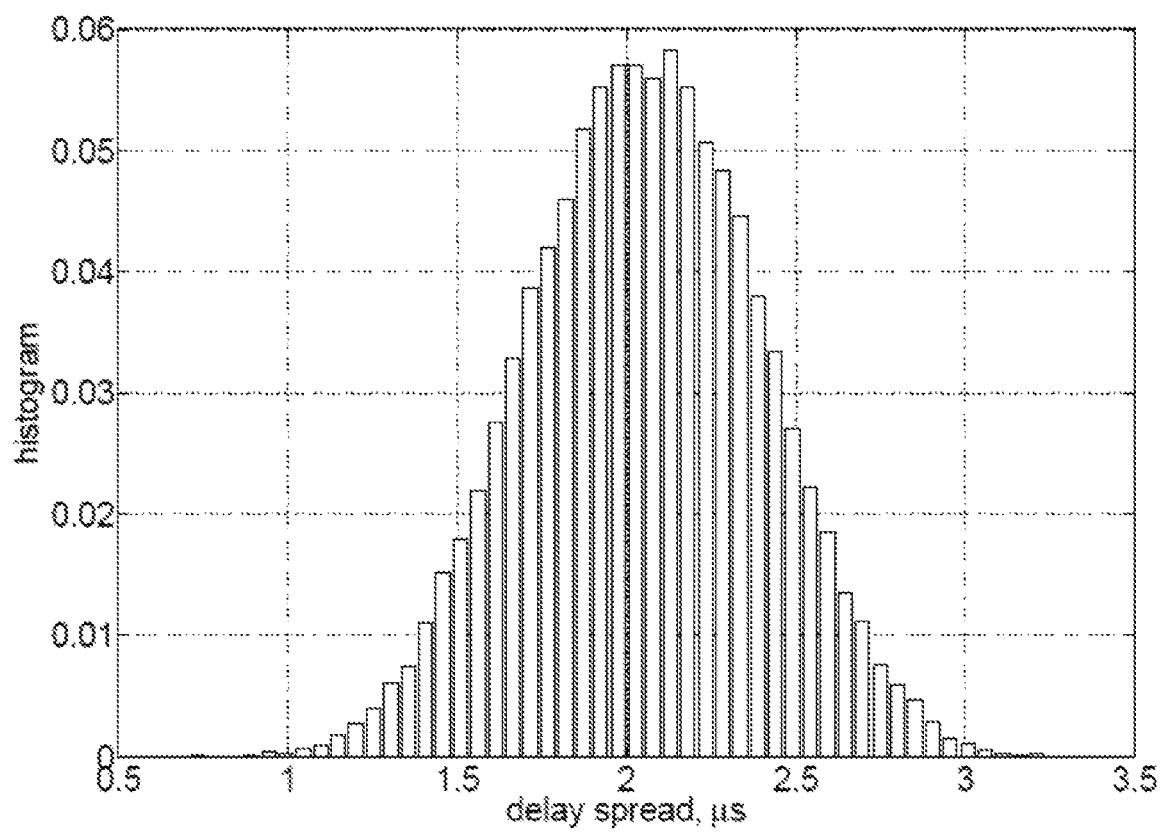
FIG. 7 is an illustration of a delay spread histogram for devices that are subject of processes and systems of the present disclosure.

Referring next to FIG. 7, a delay spread histogram (ρ=1500 km-2, w=200 m, 50,000 iterations) is depicted, where the figure shows the mean and standard deviation of the forwarding delay spread for strip widths between 100 and 200 meters. Simulations have been carried out for 3 different values of device density, ρ. The mean and standard deviation are almost independent of the device density. It is shown that for this range of strip width, the mean is approximately 2 μs with a standard deviation of no more than 0.35 μs. This is valuable information as it provides guidance on the suitable length of the cyclic prefix. For instance the length of the cyclic prefix in LTE is at least 4.7 μs while it is 10 μs for the IEEE 802.16e standard. This is not the case for the IEEE 802.11g standards where the duration of the cyclic prefix is only 0.8 μs. As such, the contention-free geo-routing scheme fits well with the PHY parameters of the LTE standard, which is an exemplary platform of embodiments of the MANET devices in accordance with the present disclosure. It can be further observed from FIG. 7 that the forwarding delay spread tends to follow a normal distribution.

Next, two types of frequency offsets are considered herewith:

1) Carrier frequency offset (CFO) discrepancy, i.e. each transmitter having a different CFO from the receiver.

2) Sampling frequency offset (SFO) between each transmitter and the receiver.

The SFO effect typically leads to two types of distortion: subcarrier frequency offset and sampling time offset. As such, SFO produces inter-symbol interference (ISI) and inter-carrier interference (ICI). However, the specifications of a crystal oscillator used in typical LTE chipsets indicate an error margin of 1 ppm at maximum. Subsequently, the SFO at 10 MHz sampling is no more than 10 Hz, which creates a max of 64×10=640 Hz at the edge of the FFT (fast Fourier transform). When normalized over a subcarrier bandwidth of 15000 Hz, it yields only a distortion of 4.26% which is probably negligible and is ignored throughout the rest of the analysis.

On the other hand, the CFO poses a rather more serious challenge. The baseband signal transmitted by device i with CFO is expressed as:

$$s_i(nT_s) = \sum_{k=-\frac{N}{2}}^{\frac{N}{2}} a_{k,n} e^{j\phi_{k,n}} e^{j2\pi(k\Delta f + \delta_i)nT_s} = \left(e^{j2\pi\frac{\delta_i}{N\Delta f}}\right)^n \sum_{k=-\frac{N}{2}}^{\frac{N}{2}} a_{k,n} e^{j\phi_{k,n}} e^{j2\pi kn/N}$$

For reference, a list of notations is provided in Table 2.

TABLE 2

| | |
|---|---|
| $\Delta_f$ | Subcarrier bandwidth |
| N | FFT size, number of samples per ODFM symbol |
| $T_s = \frac{1}{N\Delta_f}$ | Sampling time |
| $t = NT_s$ | Discrete time representation |

TABLE 2-continued

| | |
|---|---|
| $k = -\frac{N}{2} \cdots \frac{N}{2}$ | Subcarrier index |
| i = 1 ... I | Multi-node transmitters |
| $\delta_i$ | CFO of ith multi-node transmitter with respect to Rx |
| $a_{k,n} e^{j\phi_{k,n}}$ | QAM symbol time n and subcarrier k |
| $h_{i,l}$, l = 1 ... L | Channel coefficients |
| T | Time between multipath channel components |
| $T_i'$ | Latency to capture propagation delay and any other delay(s) at transmitter i |

Figure 8:
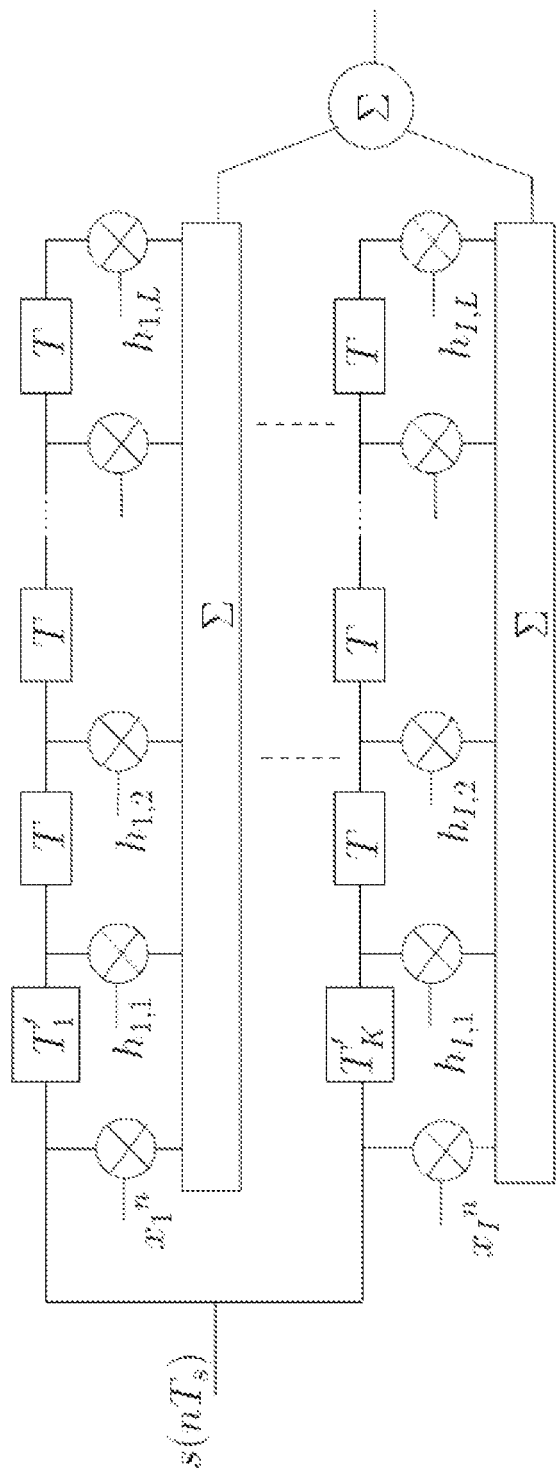
FIG. 8 is an illustration of a composite channel model including CFO effect for devices that are subject of processes and systems of the present disclosure.

Now, by letting $$x_i \triangleq e^{j2\pi\frac{\delta_i}{N\Delta f}}$$

the composite channel model can be represented as shown in FIG. 8, in which CFO can be modeled as part of the overall composite channel effect.

Figure 9:
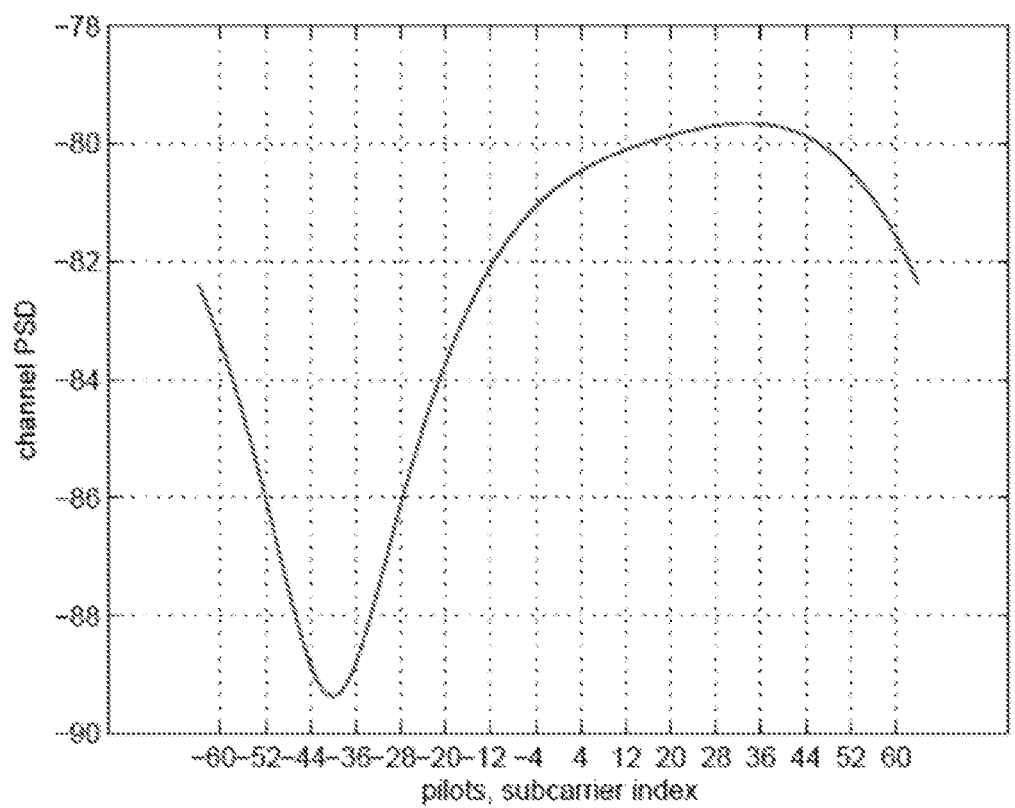
FIG. 9 is an illustration of channel power spectral density (including CFO effect) for the case of a single transmitter.
Figure 10:
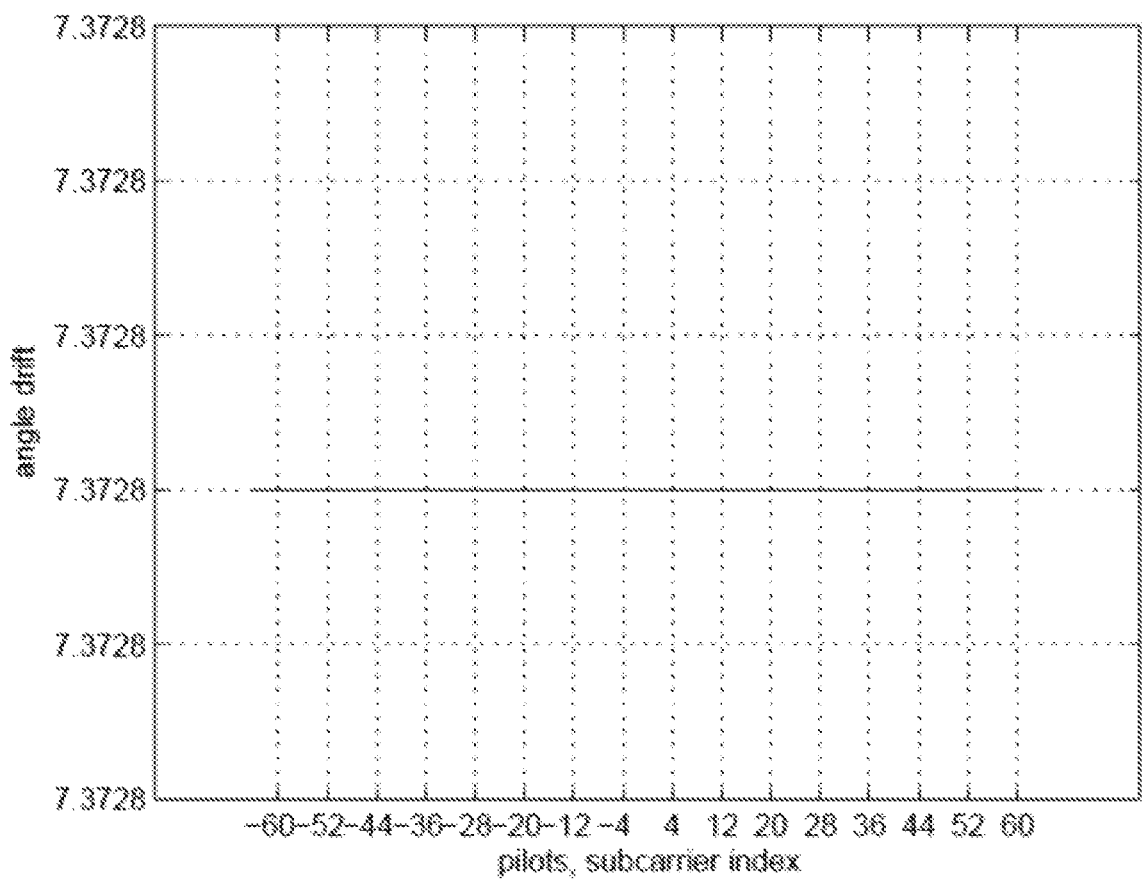
FIG. 10 is an illustration of angle drift in the case of the single transmitter of FIG. 9.
Figure 11:
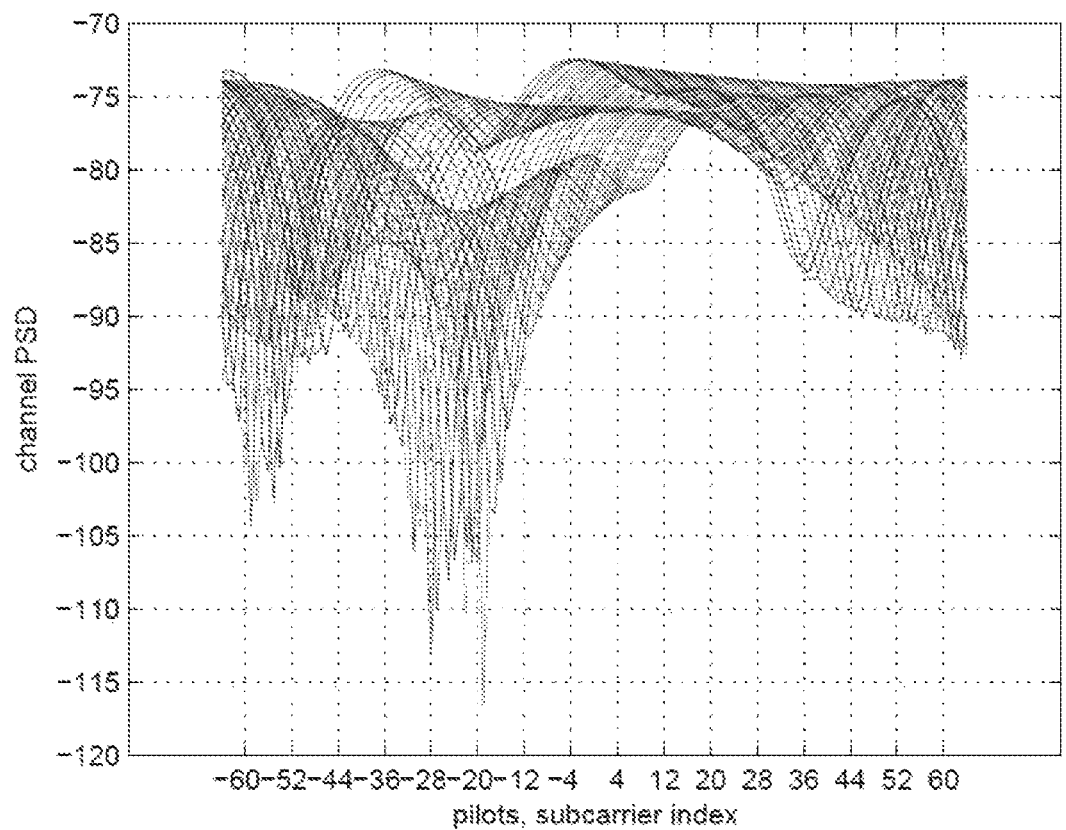
FIG. 11 is an illustration of power spectral density (including CFO effect) for the case of three multi-device transmitters.
Figure 12:
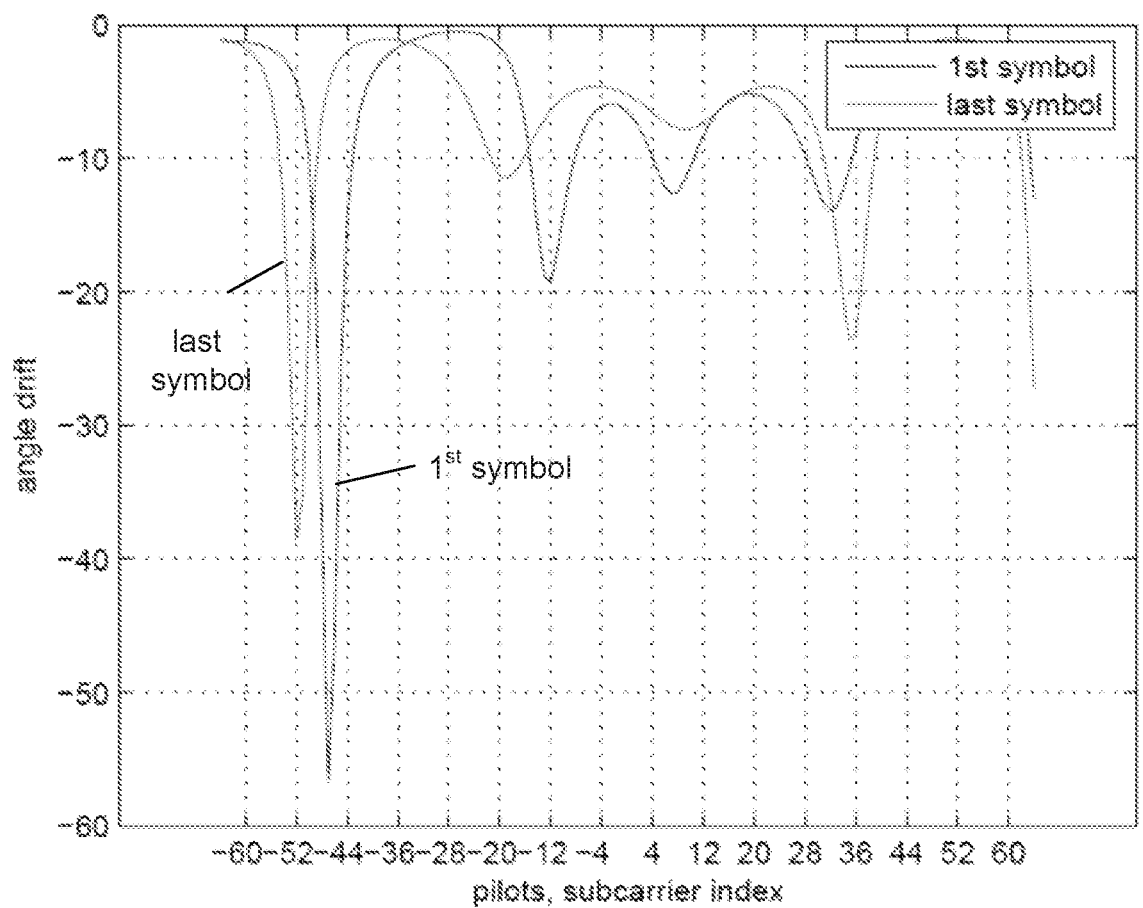
FIG. 12 is an illustration of angle drift for a case of three multi-device transmitters with CFO of ±2000 Hz.
Figure 13:
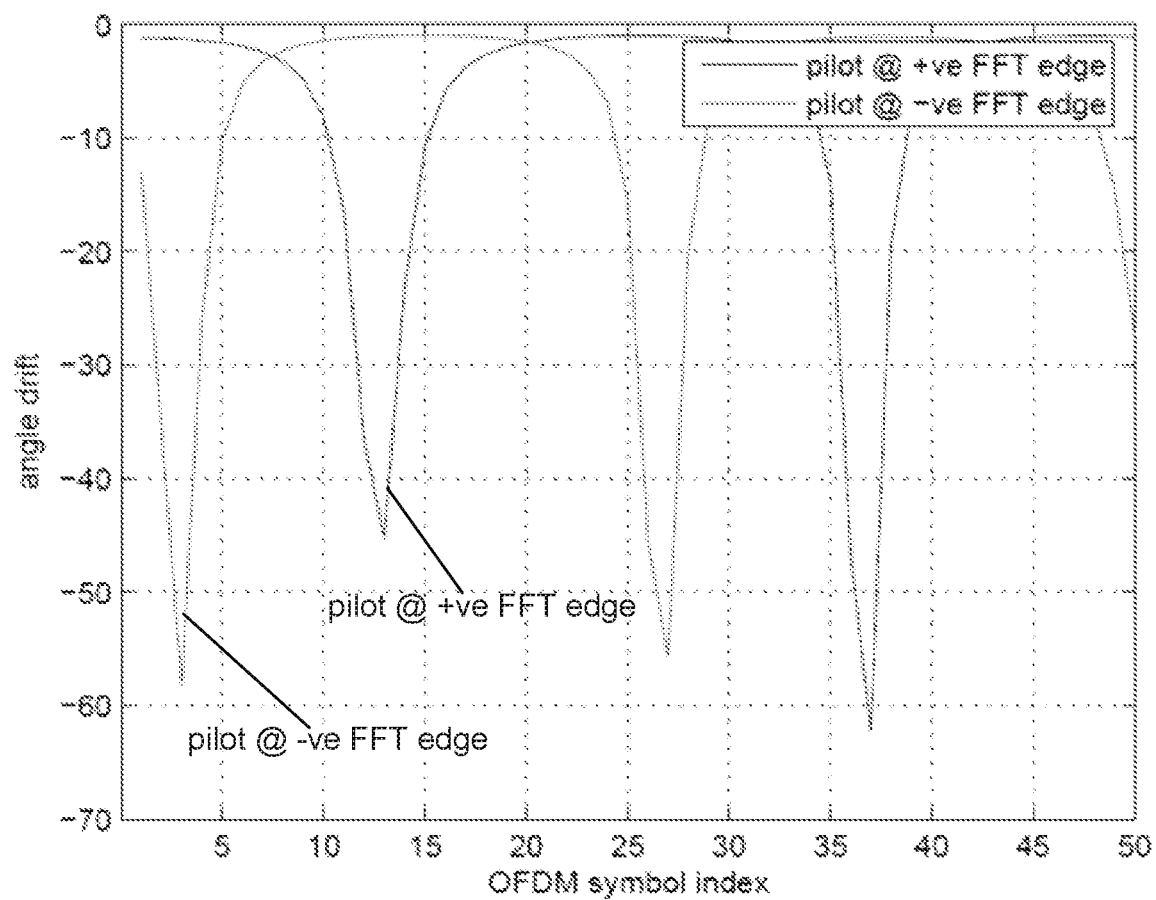
FIG. 13 is an illustration of angle drift evolution over time for the case of 3 multi-device transmitters with CFO of ±2000 Hz.

The channel for a single transmitter with CFO of 2000 Hz is simulated and results are depicted in FIG. 9 and FIG. 10. Here, FIG. 9 illustrates a channel power spectral density (including CFO effect) for the case of a single transmitter of a MANET device, where CFO=2000 Hz. FIG. 10 illustrates an angle drift shown in the case of the single transmitter, where CFO=2000 Hz from the receiver of a peer MANET device. As a matter of fact, the figure plots the angle drift over 50 successive symbols with equal drift over all pilots. Also, there is constant drift for every pair of successive symbols (thus the overlap between all lines). Therefore, it is quite apparent that linear interpolation between frequency-inserted pilots can work perfectly for a single transmitter. On the other hand, the composite channel of 3 concurrent transmitters with CFO of ±2000 Hz is simulated, and the results are depicted in FIG. 11, FIG. 12, and FIG. 13. In particular, FIG. 11 illustrates a power spectral density (including CFO effect) for the case of a 3 multi-device transmitters of a MANET device, where the CFO=±2000 Hz, and FIG. 12 shows the angle drift for the case of 3 multi-device transmitters with CFO=±2000 Hz and in which the angle drift is plotted over frequency for the first symbol and after 50 symbols. In FIG. 13, angle drift evolution is shown over time for the case of 3 multi-device transmitters with CFO of ±2000 Hz. The drift is plotted for the subcarriers with indices ±N/2.

From these results, it is apparent that linear interpolation does not offer good performance. Even if a time-based pilot structure (e.g., a comb-type pilot structure in time) is considered, linear extrapolation in time from one comb-type pilot batch to the other does not offer good performance. As such, a diagonal pilot structure does offer an adequate solution, however.

Figures 14A, 14B:
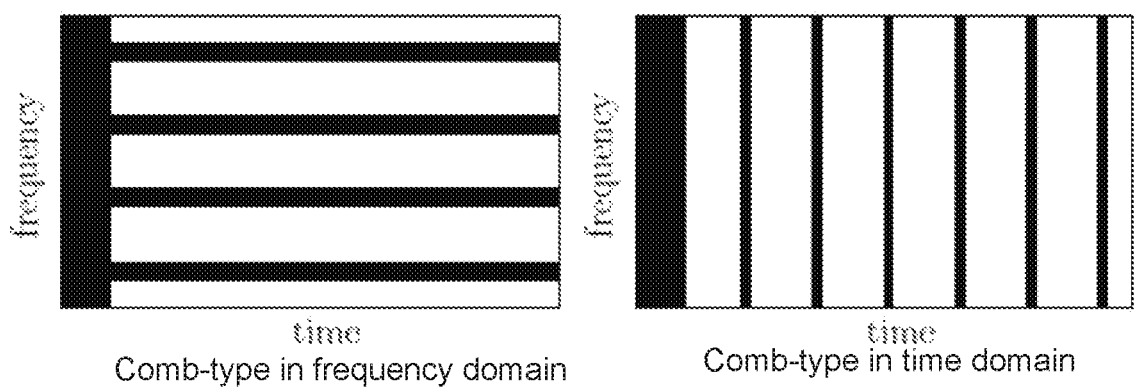
FIGS. 14A-14C are an illustration of comb-type structures in a frequency domain and in a time domain and a diagonal pilot structure, respectively.
Figure 14C:
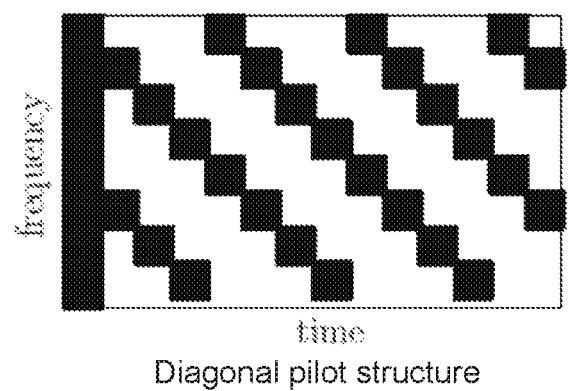

Referring now to FIGS. 14A-C, comb-type pilot structures in a frequency domain and in a time domain and a diagonal pilot structure are depicted, respectively. As stated above, the comb-type pilot structures (FIGS. 14A-B) have been shown to face challenges in extrapolation between two pilot tones. However, the diagonally shifted structure (FIG. 14C) supports better tracking of the time-varying channel, and channel estimates for subcarriers between two consecutive diagonal pilot tones may be obtained by linear interpolation. Although the current LTE PHY specification does not support diagonal pilot structures, such a structure offers better tracking in time and frequency for the highly time-varying nature of the composite channel. Such a diagonal structure may be advocated for future LTE releases and is contemplated for use with embodiments of the present disclosure.

With a diagonal pilot structure being utilized by an embodiment of the present structure, the channel estimates of subcarriers lying between two consecutive pilots are obtained by means of linear interpolation. In one approach, the channel coefficients are blindly estimated at the pilot tones in a continuous fashion using the well-known decision-directed estimation (DDE) method. Here, the (j−1)th equalized symbol is used to construct an estimate of the channel response at the Jth symbol. Assuming zero-forcing equalization, the channel estimate is given by $$\tilde{H}_j(f) = R_j(f)/\hat{S}_j(f)$$

where $S_j(f)$ and $R_j(f)$ are the Fourier transforms of the transmitted and received jth symbol respectively. The equalized jth symbol is obtained by $$\hat{S}_j(f) = R_j(f)/\tilde{H}_{j-1}(f).$$

Figure 15B:
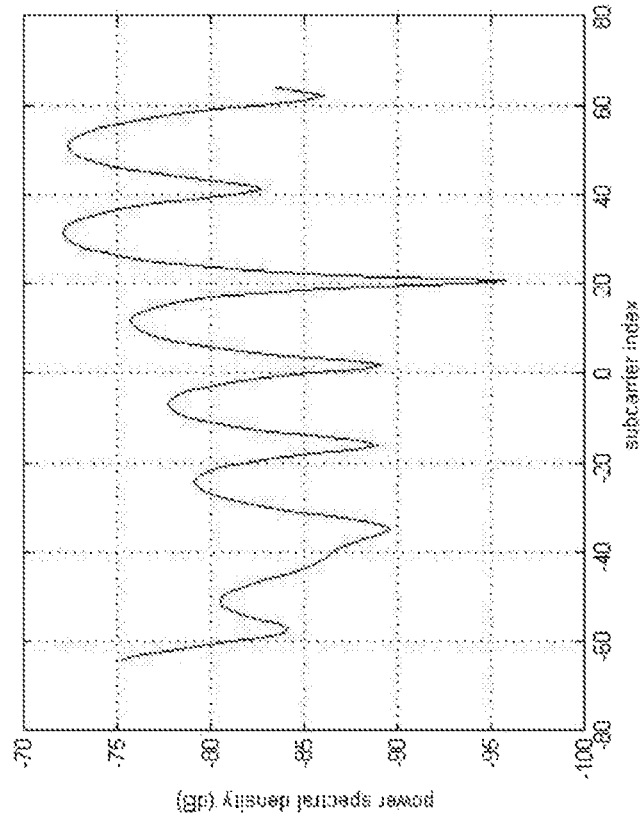
FIGS. 15A-B illustrate a power spectral density (PSD) of the composite channel for one transmitter (FIG. 15A, left) and three concurrent transmitters (FIG. 15B, right).
Figure 15A:
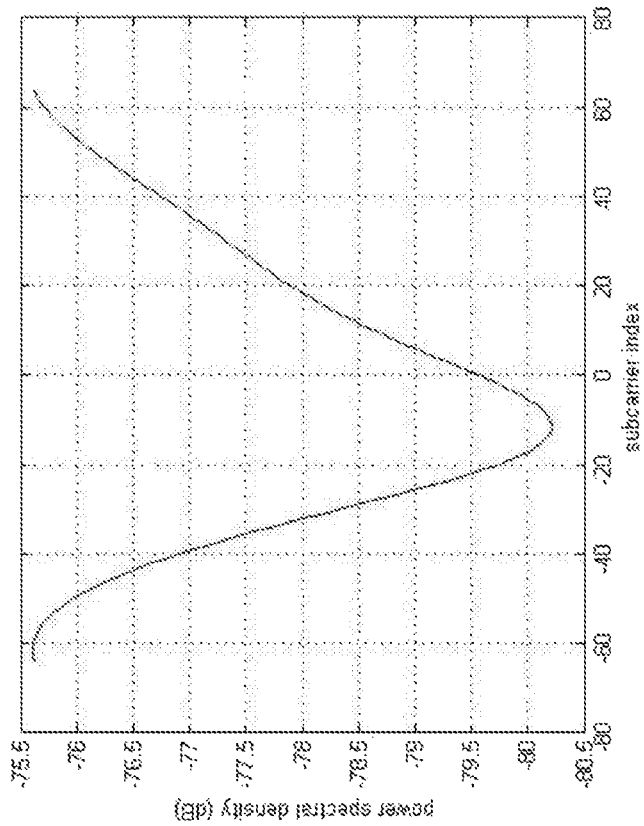

In FIGS. 15A-B, sample channel realizations are depicted. In particular, a power spectral density (PSD) of the composite channel, for one transmitter (FIG. 15A, left) and three concurrent transmitters (FIG. 15B, right), is illustrated. It is noted that the dynamic range of the composite channel is noticeable higher than that in the case of a single transmitter. Furthermore, the 2nd order statistics of the PSD (i.e. 4th order statistics of the complex channel response) for the composite channel features higher rate of fluctuations. Although fluctuation in the multi-device composite channel PSD is very frequent, the number of actual level crossings compared to the single-device channel is lower, in general. This is due to the fact that the whole PSD is raised above the designated level crossing threshold. Additionally, the dynamic range of the multi-device channel PSD is explicitly higher than the single-device case. The average for I=3 transmitters was 25 dB, while the average for I=1 was only 10 dB. In the case of I=3, there was only a 2% chance that the dynamic range exceeds 40 dB. Typical dynamic range for the FFT block is around 40 dB.

Figure 16:
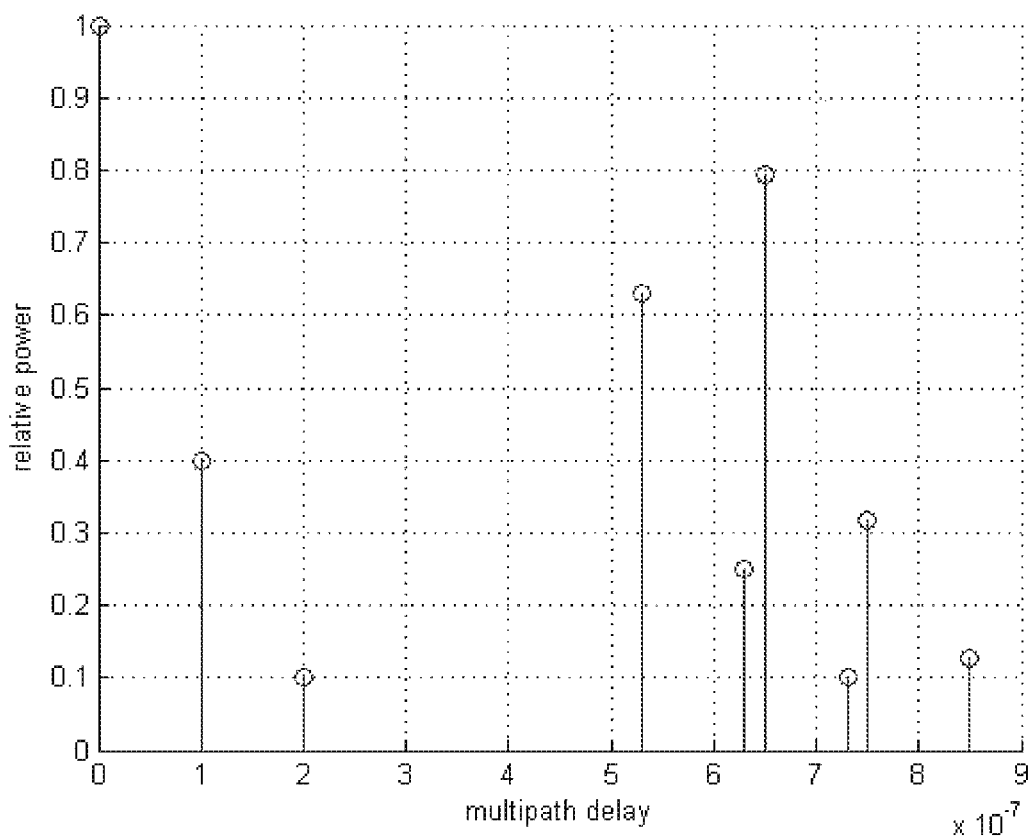
FIG. 16 is an illustration of a power delay profile in the case of three concurrent transmissions.
Figure 17:
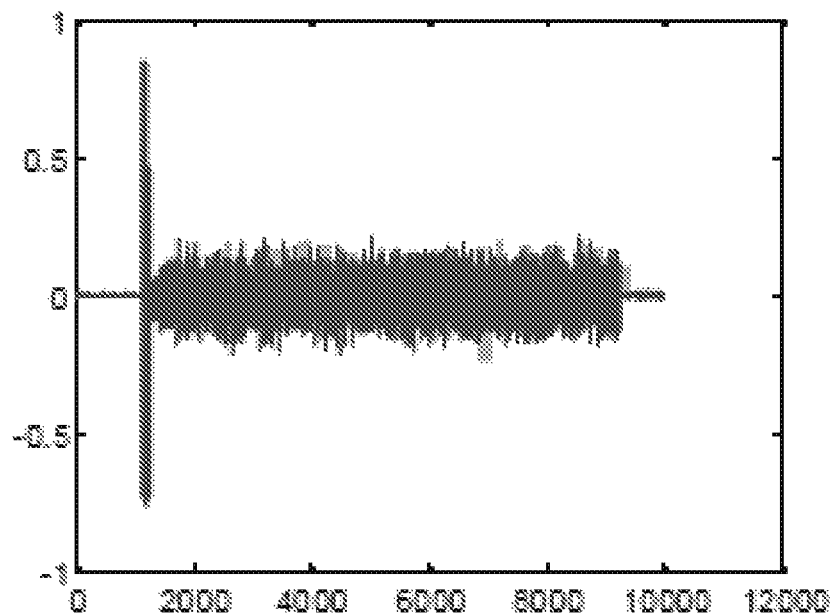
FIG. 17 is an illustration of signal to noise ratio at an AGC gain module of a receiver when the AGC gain setting is based on a correlation value.

Such a peculiar and unprecedented channel response gives rise to an unprecedented challenge, specifically with respect to the automatic gain control (AGC) module at the receiver of the MANET device. Typically, AGC modules are based on correlating the incoming signal with itself, or alternatively with stored time waveforms. The correlation result is used to adjust the amplification gain of the AGC stage. In the case of concurrent device transmissions, the power delay profile (PDP) of the composite channel has more than one specular path, as depicted in FIG. 16. For example, the figure shows a power delay profile in the case of three concurrent transmissions, and it is noted that three strong signals arrive at a relative delay of 0, 0.52, and 0.65 µs. Subsequently, a small-valued correlation result is likely to happen even though the incoming signal may have large energy content. This can lead to an exaggerated reduction on the AGC gain and give rise to a penalty in the signal to noise ratio (SNR) of the payload of the frame, as illustrated in FIG. 17. Here, the figure shows that when an AGC gain setting is merely based on the correlation value, it might lead to exaggerated attenuation in the case of a multi-device transmission.

Figure 18:
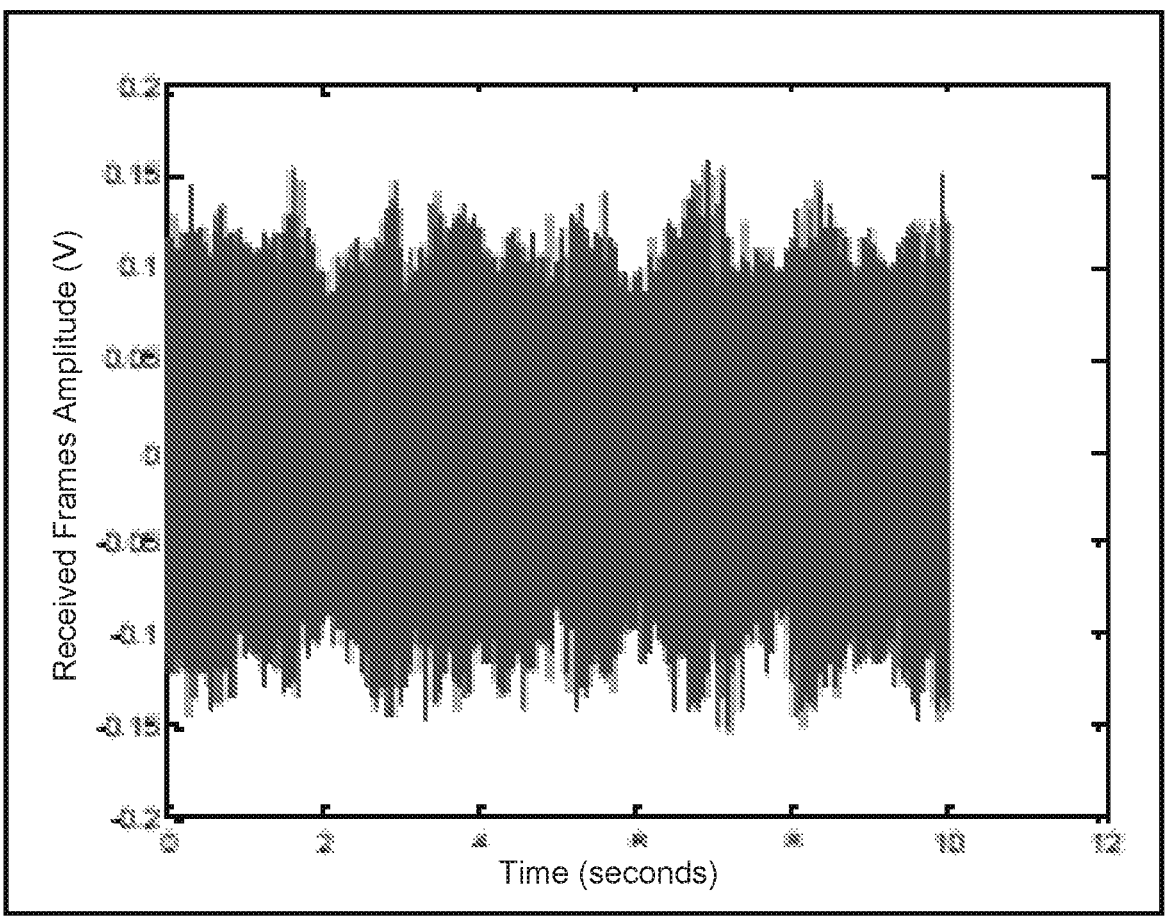
FIG. 18 is an illustration of incoming energy of a preamble time waveform using a peak detector.

To alleviate that shortcoming, the AGC module can implement a peak envelope detector function in order to estimate the peak-to-peak dynamic range of the incoming signal. Consequently, the setting of the AGC gain can be optimized, as shown in FIG. 18, by using a peak detector module/circuitry to estimate the incoming energy of the preamble time waveform and accordingly adjusting the AGC setting.

It should be noted that in various embodiments of this disclosure, there might be a preference to transmit two subsequent preambles. For such an embodiment, the first preamble may contain a common sequence and shall be used by a receiver of a MANET device to adjust the AGC gain. The second preamble may correspond to a scheme where each MANET device selects the index corresponding to its quantized displacement value, as discussed previously (see FIG. 1).

There is a broad spectrum of possible applications for embodiments of the high-throughput ultra-low-latency MANET devices and related schemes of the present disclosure. Examples include the use of a swarm of unmanned autonomous vehicles (UAV) for thermal imaging and remote sensing. UAV clusters have been also considered for 3D mapping, surveying, and other civil engineering tasks. Swarms of terrestrial robotic agents are also being increasingly considered for some time-critical field operations most notably for search and rescue and tactical missions. Another manifestation of team-based mobile cyber-physical systems includes task-oriented teams of paramedics and first responders during disasters or massively crowded events.

The availability of real-time video communications for those scenarios is indeed a powerful tool for collaborative decision-making and optimal mission execution. A paramount task for team-based mobile cyber-physical system is the joint planning and optimization of motion trajectories of mobile devices. The timeliness of disseminating path planning and control signaling messages is crucial. Hence, end-to-end latency is a major performance metric. UAV-based cyber-physical systems may be quite bandwidth-hungry. This is true since real-time video communication is sought between the team members. As a special case of mobile ad hoc networks (MANET), team-based mobile cyber-physical systems undoubtedly push the envelope in terms of latency and throughput requirements.

Mobile workforce network systems entail the deployment of teams of autonomous robots (unmanned vehicles) as well as human agents to accomplish certain critical missions. Within such a context, swarms of unmanned aerial or terrestrial vehicles are dispatched into the field to conduct a mission under human supervision or control, or in other instances jointly with human agents. A broad spectrum of applications is possible. Examples include the use of a swarm of unmanned aerial vehicles (UAV) for thermal imaging and remote sensing. UAV dusters have been also considered for 3D mapping, surveying, and other civil engineering tasks. Swarms of terrestrial robotic agents are also being increasingly considered for some time-critical field operations most notably for search and rescue and tactical missions. Another manifestation of team-based mobile workforce systems includes task-oriented teams of paramedics and first responders during disasters or massively crowded events. The availability of real-time video communications for those scenarios is indeed a powerful tool for collaborative decision-making and optimal mission execution.

Figure 19:
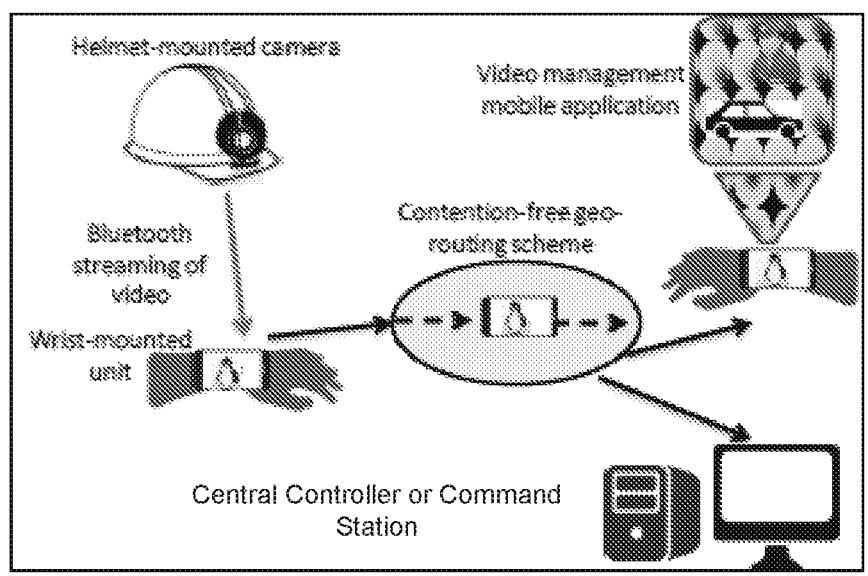
FIG. 19 is an illustration of a MANET system designed to disseminate real-time video using the contention-free geo-routing scheme in accordance with embodiments of the present disclosure.

The market for mobile workforce applications is rapidly unfolding. Fujitsu® has recently released a head-mounted display to help enterprises better manage their on-site operations. Wearable Intelligence, a USA-based startup partially funded by Saudi ARAMCO® Energy Ventures (SAEV), is currently offering wearable devices for mobile workforce to improve their efficiency in the field. Similarly, another USA-based startup Atheer Labs, is developing augmented reality gear which aim to maximize efficiency of workmen in the field. Nonetheless, a true differentiator of the present technology of the disclosure is the fact that it enables bandwidth-hungry video streaming not only to/from a centralized control or command station but also amongst the team members of a mobile field workforce. This is possible thanks to the ultra-low latency of WQM technology, in which WQM is a queue management scheme customized for wireless networks. With a large streaming pipe within the team members, a wide array of innovative applications and uses can be unleashed. Consequently, this disclosure targets the following market segments:

1. Civil:
   a. Public safety
   b. First responders
   c. Paramedics
   d. Search & rescue
2. Security & defense:
   a. Law enforcement
   b. Tactical operations
   c. Dismounted soldier networks Demands sought by these customer segments include:
1. Establish a collaborative work environment (CWE) among personnel in the field
2. Eliminate inefficiencies and risks pertaining to missing or miscommunicated information in the field
3. Coordinate path trajectories to maximize area coverage by field personnel
4. Enable in-situ collaborative decision-making in the face of unexpected events Benefits to end-users are numerous, to list a few:
1. Reduce time to complete a mission
2. Reduce chances of field personnel injuries
3. Reduce training costs of junior staff
4. In the specific case of civil workforces in service during natural disasters or emergency situations:
   a. Reduce human casualties
   b. Reduce execution time of evacuation plans
   c. Reduce "no-report" rates in evacuation plans One possible manifestation of how this disclosure can be utilized for first responders is presented in FIG. 19 which illustrates a high-throughput ultra-low-latency MANET system of the present disclosure that is designed to disseminate real-time video using the contention-free geo-routing scheme. In this example, a helmet-mounted camera streams video over Bluetooth to a wrist-mounted LTE device. The mobile LTE device transmits the video frames in accordance to the contention-free geo-routing scheme presented here. The video stream may be broadcast to the whole cluster, geo-cast or multicast to a subset of team members, or unicast to a centralized control or command station. The mobile LTE device can be used by a team member to display one or more video streams from other team members.

Figure 20:
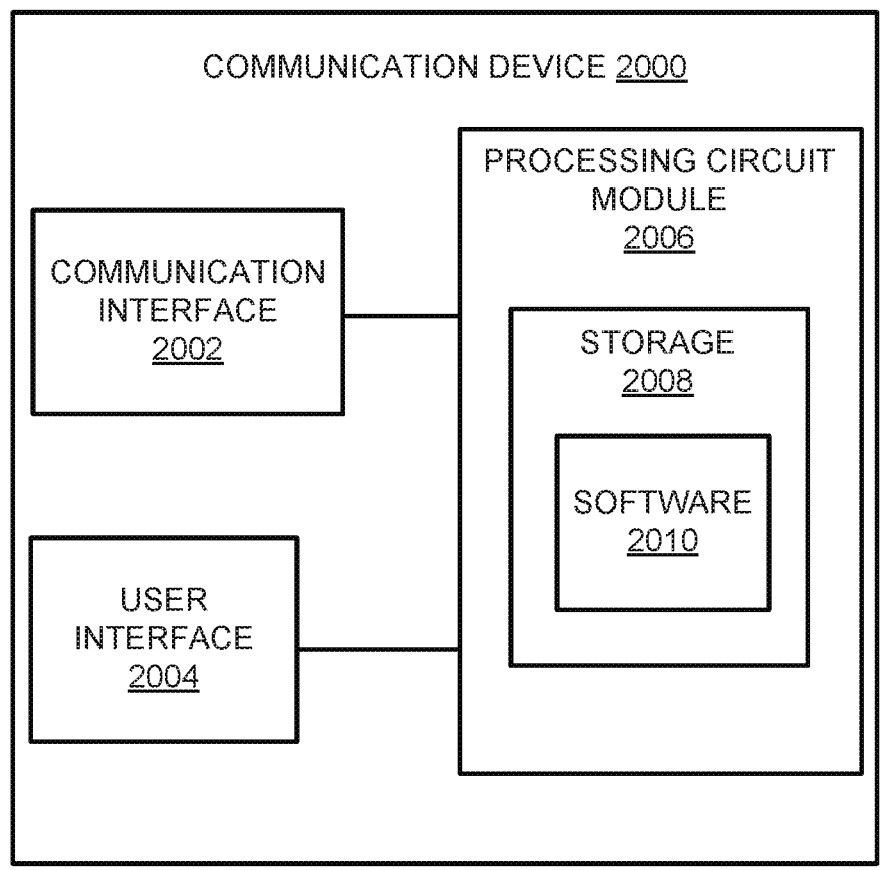
FIG. 20 is an illustration of an exemplary communication device in an embodiment of a communication system of the present disclosure

FIG. 20 illustrates an exemplary communication device 2000 in an embodiment of a communication system of the present disclosure. Communication device 2000 comprises communication interface 2002, user interface 2004, and processing circuit module 2006 in communication with the communication interface 2002 and user interface 2004. Processing circuit module 2006 includes storage 2008, which can comprise a disk drive, flash drive, memory circuitry, or other memory device. Storage 2008 can store software 2010 which is used in the operation of the communication device 2000. Software 2010 may include computer programs, firmware, or some other form of machine-readable instructions, including an operating system, utilities, drivers, network interfaces, applications, or some other type of software. Processing circuit module 2006 may include a microprocessor and other circuitry to retrieve and execute software 2010 from storage 2008. Communication device 2000 may further include other components such as a power management unit, a control interface unit, etc., which are omitted for clarity. Communication interface 2002 permits the communication device 2000 to communicate with other network elements or devices. User interface 2004 permits the configuration and control of the operation of the communication device 2000.

Certain embodiments of the present disclosure can be implemented in hardware, software, firmware, or a combination thereof. Aspects of various embodiments of a high-throughput ultra-low-latency MANET device/system of the present disclosure are implemented in software or firmware that is stored in a memory or other computer readable medium and that is executed by a suitable instruction execution system. If implemented in hardware, as in an alternative embodiment, aspects of the MANET device/system can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the context of this document, a "computer-readable medium" can be any means that can contain, store, communicate, propagate, or transport the program for use by or in connection with an instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments of the present disclosure includes embodying the functionality of embodiments of the present disclosure in logic embodied in hardware or software-configured mediums.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and protected by the following claims.

Therefore, having thus described the disclosure, at least the following is claimed:

1. A method of routing a packet over an ad hoc network comprising:
   receiving, at a communication device, the packet from a source device;
   extracting, at the communication device, position information from a preamble structure of the packet;
   determining, at the communication device, a position of the source device relative to the position of the communication device based at least in part on the position information in the preamble structure of the packet;

computing, at the communication device, a progress in routing the packet that has been made towards a destination with respect to the source device as a progress value;

determining, at the communication device, to forward the packet towards the destination based at least in part on the progress value;

inserting, at the communication device, the progress value within the preamble structure of the packet as updated position information; and transmitting, at the communication device, the packet towards the destination.

2. The method of claim 1, wherein the progress is computed by estimating an energy of a received waveform during an interval corresponding to the preamble structure.

3. The method of claim 1, wherein the progress value is quantized using 6 bits.

4. The method of claim 1, wherein determining to forward the packet comprises scanning the preamble sequence to extract the position information, determining a respective position for each previous hop of the packet, and determining whether a current hop of the packet has made progress towards the destination.

5. The method of claim 1, further comprising determining a current position of the communication device from an external localization signal sent from a central control station.

6. The method of claim 1, further comprising determining a current position of the communication device from at least three position values of neighboring communication devices obtained from respective preamble structures of packets received by the communication device and a time of arrival of the respective packets at the communication device.

7. The method of claim 1, wherein an additional preamble structure is retrieved from the packet, the additional preamble structure containing a setting for automatic gain control (AGC) gain within a receiver of the communication device.

8. The method of claim 1, wherein the communication device is integrated within an unmanned autonomous vehicle.

9. The method of claim 1, wherein the communication device is integrated within a mobile cyber-physical system.

10. The method of claim 1, wherein the communication device comprises a wearable communication device.

11. The method of claim 1, wherein the communication device comprises a mobile ad hoc network device.

12. The method of claim 1, wherein the communication device is configured to broadcast a video stream to peer communication devices.

13. The method of claim 1, wherein the communication device is configured to unicast a video stream to a central control station.

14. The method of claim 1, further comprising retrieving one or more pilot symbols from the packet and estimating a channel response of one or more subcarriers of a composite channel.

15. The method of claim 14, wherein the one or more pilot symbols comprise a diagonal pilot structure.

16. An apparatus configured to execute the method of claim 1, wherein the apparatus comprises the communication device.

17. A system comprising:
a communication interface of a communication device;
a processing circuit module of the communication device configured to:
receive a packet from a source device;
extract position information from a preamble structure of the packet;
determine a position of the source device relative to the position of the communication device based at least in part on the position information in the preamble structure of the packet;
compute a progress in routing the packet that has been made towards a destination with respect to the source device as a progress value;
determine to forward the packet towards the destination based at least in part on the progress value;
insert the progress value within the preamble structure of the packet as updated position information; and
cause the communication interface to transmit the packet towards the destination.

18. The system of claim 17, further comprising the source device.

19. The system of claim 17, wherein the progress is computed by estimating an energy of a received waveform during an interval corresponding to the preamble structure.

20. The system of claim 17, wherein determining to forward the packet comprises scanning the preamble sequence to extract the position information, determining a respective position for each previous hop of the packet, and determining whether a current hop of the packet has made progress towards the destination.

* * * * *